(12) United States Patent
Matsui et al.

(10) Patent No.: US 7,293,144 B2
(45) Date of Patent: Nov. 6, 2007

(54) CACHE MANAGEMENT CONTROLLER AND METHOD BASED ON A MINIMUM NUMBER OF CACHE SLOTS AND PRIORITY

(75) Inventors: Yoshinori Matsui, Yokohama (JP); Katsuhisa Miyata, Yokohama (JP); Nobuyuki Kishi, Yokohama (JP)

(73) Assignee: Hitachi, Ltd, Tokyo (JP)

( * ) Notice: Subject to any disclaimer, the term of this patent is extended or adjusted under 35 U.S.C. 154(b) by 414 days.

(21) Appl. No.: 10/968,964

(22) Filed: Oct. 21, 2004

(65) Prior Publication Data
US 2005/0268031 A1    Dec. 1, 2005

(30) Foreign Application Priority Data
May 28, 2004    (JP)    ............................. 2004-158627

(51) Int. Cl.
G06F 12/00 (2006.01)
G06F 13/00 (2006.01)
G06F 13/28 (2006.01)

(52) U.S. Cl. ..................... 711/151; 711/130; 711/147; 711/158

(58) Field of Classification Search ............... 711/130, 711/151
See application file for complete search history.

(56) References Cited

U.S. PATENT DOCUMENTS 5,715,430 A * 2/1998 Hirayama ................... 711/141
7,035,990 B1 * 4/2006 Muhlbauer .................. 711/172
2002/0010772 A1 * 1/2002 Kusano ....................... 709/223
2002/0078306 A1 * 6/2002 George ....................... 711/145
2002/0143843 A1 * 10/2002 Mehta ......................... 709/102
2004/0078518 A1 * 4/2004 Kuwata ....................... 711/113
2004/0243771 A1 * 12/2004 Oldfield et al. ............. 711/151
2006/0288159 A1 * 12/2006 Haruna et al. .............. 711/113

FOREIGN PATENT DOCUMENTS

JP    2003-330792    11/2003

\* cited by examiner

*Primary Examiner*—Donald Sparks
*Assistant Examiner*—Prasith Thammavong
(74) *Attorney, Agent, or Firm*—Mattingly, Stanger, Malur & Brundidge, PC

(57) ABSTRACT

In order to solve problems that, when the use area used by data of a certain kind reaches the upper limit value, the cache memory cannot be used even though a space area exists in the use area used by data of other kind and utilization efficiency of the cache memory decreases, and that, when the upper limit value of the use area is discarded, on the other hand, data inside the area held is replaced by other data and disappears, a storage area of a size of a minimum guarantee value corresponding to each computer is set inside a disk cache memory in a control device of a storage device connected to a plurality of computers and a storage area is allocated to each computer in accordance with priority corresponding to each computer.

20 Claims, 21 Drawing Sheets

(LINK STRUCTURE OF QUEUE)

FIG. 6

610 SCHEDULE DEFINITION ENTRY        145

| DATE | TIME | NEW PATH DEFINITION INFORMATION |
|------|------|------|
| 620 | 621 | 622 |
| ⋮ | ⋮ | ⋮ |

PATH DEFINITION INFORMATION

| PATH IDENTIFIER (1300) | PRIORITY (1301) | CACHE SLOT MINIMUM GUARANTEE VALUE (1302) |
|---|---|---|
| HOST A | 1 | 3 |
| HOST B | 2 | 4 |
| INVALID | 3 | 0 |

QUEUE MANAGEMENT INFORMATION

| PATH IDENTIFIER (1303) | QUEUE HEADER (1304) | CACHE SLOT USE QUANTITY (1305) |
|---|---|---|
| HOST A | QUEUE A | 2 |
| HOST B | QUEUE B | 4 |
| INVALID | QUEUE C | 1 |

QUEUE

FIG. 14

| Cache Slot Identifier (1400) | Path Identifier (1401) | Data Storage Position Information (1402) | |
|---|---|---|---|
| | | Logical Volume Identifier | Logical Address |
| 0 | INVALID | INVALID | INVALID |
| 1 | HOST A | VOL0 | ADR1 |
| 2 | HOST A | VOL0 | ADR2 |
| 3 | HOST B | VOL0 | ADR3 |
| 4 | HOST B | VOL0 | ADR4 |
| 5 | HOST B | VOL0 | ADR5 |
| 6 | HOST B | VOL0 | ADR6 |

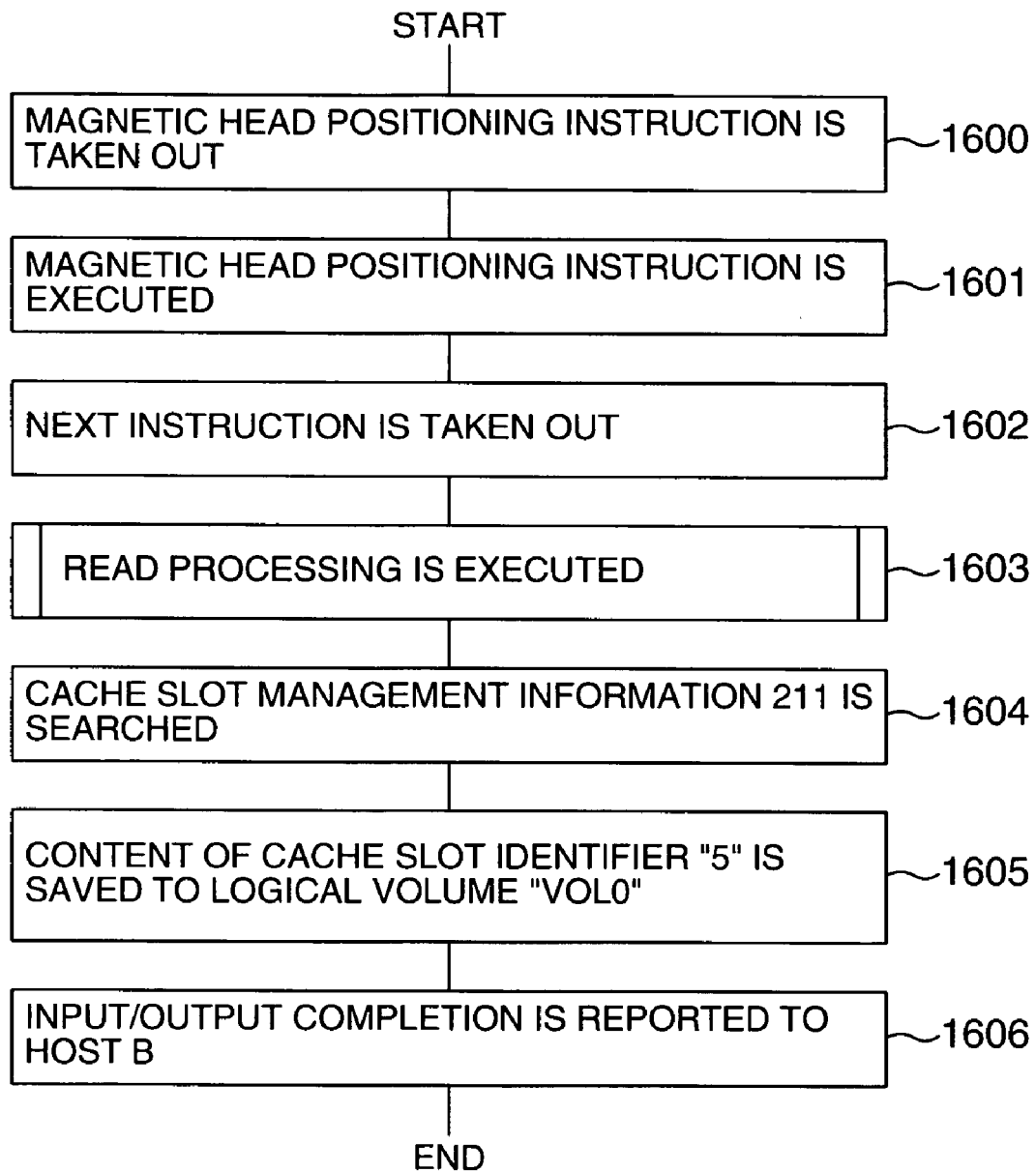

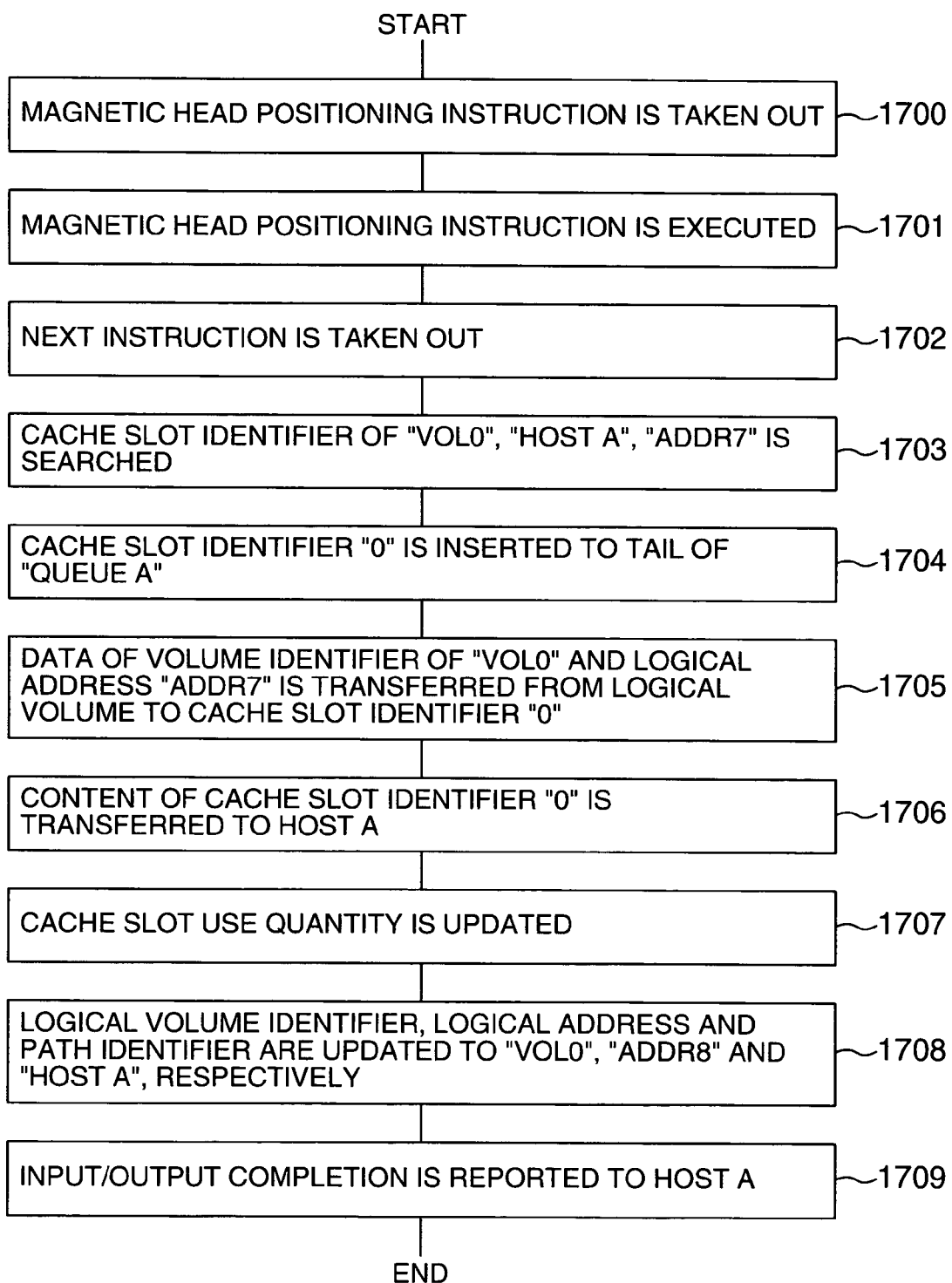

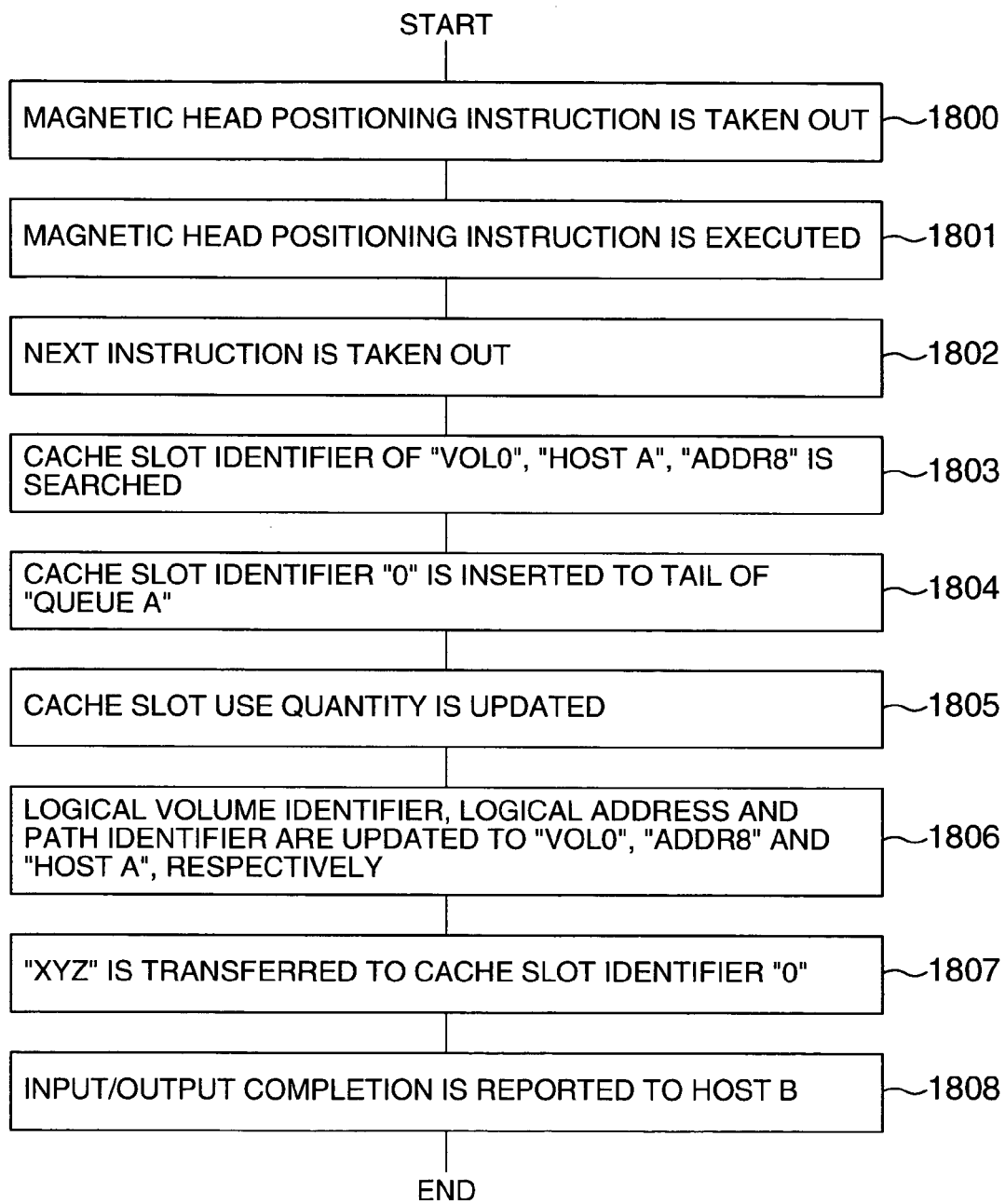

FIG. 19A

| INSTRUCTION KIND 1900 | PATH IDENTIFIER 1901 | PRIORITY 1902 |
|---|---|---|
| CHANGE OF PRIORITY | HOST A | 1 |

FIG. 19B

| INSTRUCTION KIND 1910 | PATH IDENTIFIER 1911 | CACHE SLOT MINIMUM GUARANTEE VALUE 1912 |
|---|---|---|
| CHANGE OF SLOT USE QUANTITY UPPER LIMIT VALUE | HOST A | 2 |

FIG. 19C

| INSTRUCTION KIND 1920 | PATH IDENTIFIER 1921 | PRIORITY 1922 | CACHE SLOT MINIMUM GUARANTEE VALUE 1923 |
|---|---|---|---|
| ADDITION | HOST A | 1 | 2 |

FIG. 19D

| INSTRUCTION KIND 1930 | PATH IDENTIFIER 1931 |
|---|---|
| DELETION | HOST A |

FIG. 20A

| PATH IDENTIFIER (2000) | PRIORITY (2001) | CACHE SLOT MINIMUM GUARANTEE VALUE (2002) |
|---|---|---|
| HOST A | 1 | 3 |
| HOST B | 2 | 4 |
| HOST C | 2 | 4 |
| INVALID | 3 | 0 |

FIG. 20B

| PATH IDENTIFIER (2003) | QUEUE HEADER (2004) | CACHE SLOT USE QUANTITY (2005) |
|---|---|---|
| HOST A | QUEUE A | 4 |
| HOST B | QUEUE B | 5 |
| HOST C | QUEUE B | 5 |
| INVALID | QUEUE Z | 3 |

FIG. 22

| 2200 | 2201 | 2202 | 2203 | 2204 |
|---|---|---|---|---|
| DATE | TIME | PATH IDENTIFIER | PRIORITY | CACHE SLOT MINIMUM GUARANTEE VALUE |
| X MONTH Y DAY | 8:00 | HOST A | 2 | 6 |
| | | HOST B | 1 | 1 |
| WEEKDAY | 8:00 | HOST A | 1 | 3 |
| | | HOST B | 2 | 4 |
| WEEKDAY | 20:00 | HOST A | 2 | 5 |
| | | HOST B | 1 | 2 |
| SATURDAY | 8:00 | HOST A | 2 | 6 |
| | | HOST B | 1 | 1 |

CACHE MANAGEMENT CONTROLLER AND METHOD BASED ON A MINIMUM NUMBER OF CACHE SLOTS AND PRIORITY

INCORPORATION BY REFERENCE

The present application claims priority from Japanese application JP2004-158627 filed on May 28, 2004, the content of which is hereby incorporated by reference into this application.

BACKGROUND OF THE INVENTION

This invention relates to a cache control technology of a storage device.

A cache memory is disposed inside a storage device so that an access from the second and on to the same data can be read out from the cache memory and a high speed access can be made.

Since the capacity of the cache memory is smaller than that of a disk device, however, it is difficult to arrange all the data in the cache memory. Therefore, the data to be arranged on the cache memory must be selected.

According to the prior art technology described in JP-A-2003-330792, the data to be stored in the cache memory are divided into those having high frequency of use and those having low frequency of use, the use area of the cache area is divided correspondingly and an upper limit size is set to each use area to prevent the data having high use frequency from being purged out by the data having low use frequency and to improve a cache hit ratio.

SUMMARY OF THE INVENTION

In the method for controlling the cache memory according to the prior art that relies on the data kind based on the use frequency, the upper limit size of the use area must be decided in advance. Therefore, when the use area used by the data of a certain kind reaches the upper limit value, for example, the cache memory cannot be used any more even though a space area exists in the use area used by other kind of data and utilization efficiency of the cache memory is low. When the upper limit value of the use area is discarded to effectively utilize this space area, on the other hand, the space area can be eliminated, it is true, but the problem occurs in that a new area cannot be secured because almost all the areas are occupied by other computers and the data held inside the area is replaced by other data. This problem is likely to occur particularly when input/output requests are generated substantially simultaneously from a plurality of computers to the storage device and moreover when a plurality of input/output requests are not distinguished from one another in processing.

It is therefore an object of the invention to provide a method for controlling a cache memory of a storage device that can effectively utilize a space area.

To accomplish this object, the invention sets storage areas each having a minimum guarantee value expressing a size of a storage area to be minimum secured in such a manner as to correspond to each computer by the number of areas having a predetermined size inside a disk cache memory in a control device of a storage device connected to a plurality of computers, and allocates a storage area to each computer inside the storage areas other than the storage area having the minimum guarantee value in accordance with priority which determines a priority order for securing the storage area inside the cache memory in such a manner as to correspond to each computer. In the invention, the priority and the minimum guarantee value for each computer are in advance scheduled and are rendered variable in accordance with a time zone.

Even when the major proportions of the storage area inside the cache memory are occupied by other computers, the invention makes it possible to secure the storage area having the minimum guarantee value. Because the storage area is allocated from the space area in accordance with the priority corresponding to the computer, the cache memory can be utilized effectively in accordance with the form of utilization.

Other objects, features and advantages of the invention will become apparent from the following description of the embodiments of the invention taken in conjunction with the accompanying drawings.

BRIEF DESCRIPTION OF THE DRAWINGS

FIG. 6 is a detailed view of schedule definition information 145;

FIG. 14 shows an embodiment of slot management information 211;

FIG. 16 shows an operation flow of a cache control processing 143 when an input/output 1510 (read; when data exists on cache) is executed;

FIG. 17 shows an operation flow of the cache control processing 143 when an input/output 1520 (write; when data does not exist on cache) is executed;

FIG. 18 shows an operation flow of the cache control processing 143 when an input/output 1530 (write) is executed;

FIGS. 19A to 19D show an embodiment of input/output to path information;

FIGS. 20A to 20B show an embodiment of path information;

FIG. 22 is an embodiment of schedule information;

DESCRIPTION OF THE. EMBODIMENT

Figure 1:
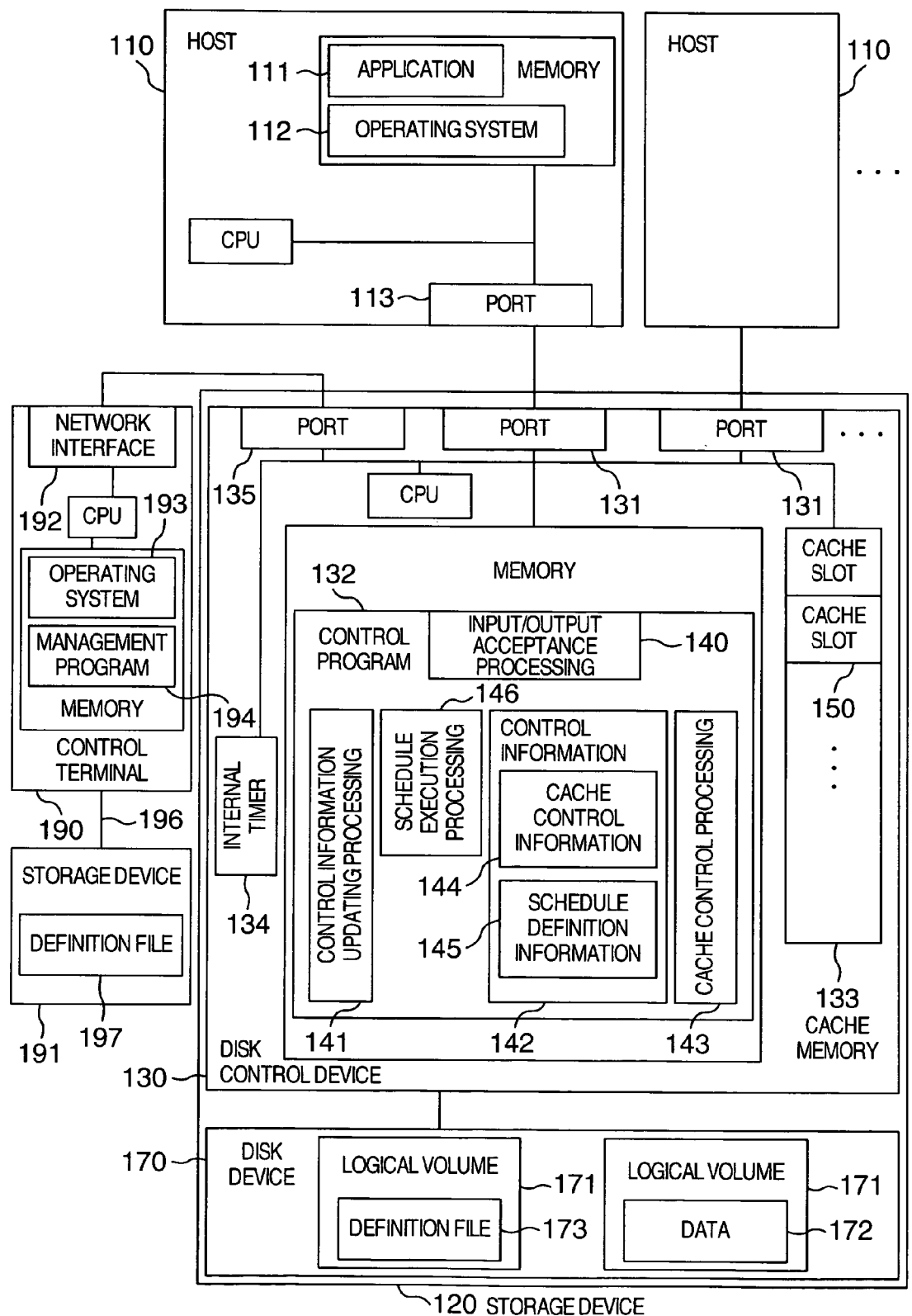
FIG. 1 shows a system configuration of a disk device and hosts connected to the disk device.

An embodiment of the invention will be explained. FIG. 1 shows a system configuration of a storage device and host computers (hereinafter called "hosts") connected to the storage device.

The system according to this embodiment includes at least one host 110, a storage device 120, a control terminal 190 and a storage device 191.

The host 110 is connected to the storage device 120 through a port 113. Connection of the port 113 to the storage device 120 is not limited to wiring shown in the drawing but may use SAN (Storage Area Network), etc.

The host 110 is an ordinary computer including a main memory device (hereinafter called "memory") storing an application 111 and an operating system 112 and CPU (processing unit) for executing these programs.

The application 111 can request input/output to the operating system 112.

The operating system 112 accepts the input/output request from the application 111, generates an instruction for the logical volume 171, whenever necessary, and operates the input/output instruction.

The storage device 120 includes a disk control device 130 and a disk device 170. The disk control device 130 and the disk device 170 are wire-connected.

The disk control device 130 has ports 131, a control program 132, a cache memory 133, an internal timer 134, a port 135, a main memory device (hereinafter called "memory") storing the control program 132 and a CPU (processing unit) for executing the program. The ports 131, the cache memory 133, the internal timer 134, the port 135, the memory and the CPU are connected mutually through internal buses. The control program 132 may exist either in the memory inside the disk control device 130 or in the host 110 connected to the disk control device 130 through the input/output path 131. This embodiment represents an example where the control program 132 exists in the memory inside the disk control deice 130.

Connection of the port 131 to the host 110 is not limited to wiring shown in the drawing but may use connection by SAN, or the like.

The control program 132 includes an input/output acceptance processing 140, a control information updating processing 141, control information 142, a cache control processing 143, cache control information 144, schedule definition information 145 and a schedule execution processing 146 and controls input/output sent from the host 110 and a control terminal 190.

The cache memory 133 has a plurality of cache slots 150. Each cache slot 150 is a unit of a storage area constituted by an area obtained by equally dividing the cache memory 133. A unit of a logical storage area may be constituted as the cache slot 150 by gathering fragments of areas arranged physically dispersedly.

The internal timer 134 is a timepiece held by the disk control device 132.

The port 135 is a connection portion with the control terminal 190.

The control terminal 190 is an ordinary computer including a network interface 192, an operating system 193, a main memory device (hereinafter called "memory") storing a management program (one of applications) 194 and a CPU (processing unit) for executing these programs. Unlike the host 110, the control terminal 190 is a computer directed to control the storage device 120.

The control terminal 190 is connected to the storage device 120 through the network interface 192. Connection of the control terminal 190 to the storage device 120 is not limited to wiring shown in the drawing but may be connection using SAN, or the like. The management program 194 can generate the input/output request through the operating system 193 and the network interface 192.

A storage device 191 is connected to the control terminal 190. The storage device 191 may be of any type of a medium so long as it can store an operation result of the control terminal 190. It is possible to take out the content of the control information 142 from the input/output request from the management program 194 and to store it as a definition file 197 in the storage device 191.

The disk driving device 170 has at least one logical volume 171. The logical volume 171 stores data 172 that can be read and written in accordance with the input/output request from the application 111. It is also possible to take out the content of the control information 142 from the input/output request from the application 111 and to store it as the definition file 173 in the logical volume 171.

Figure 23:
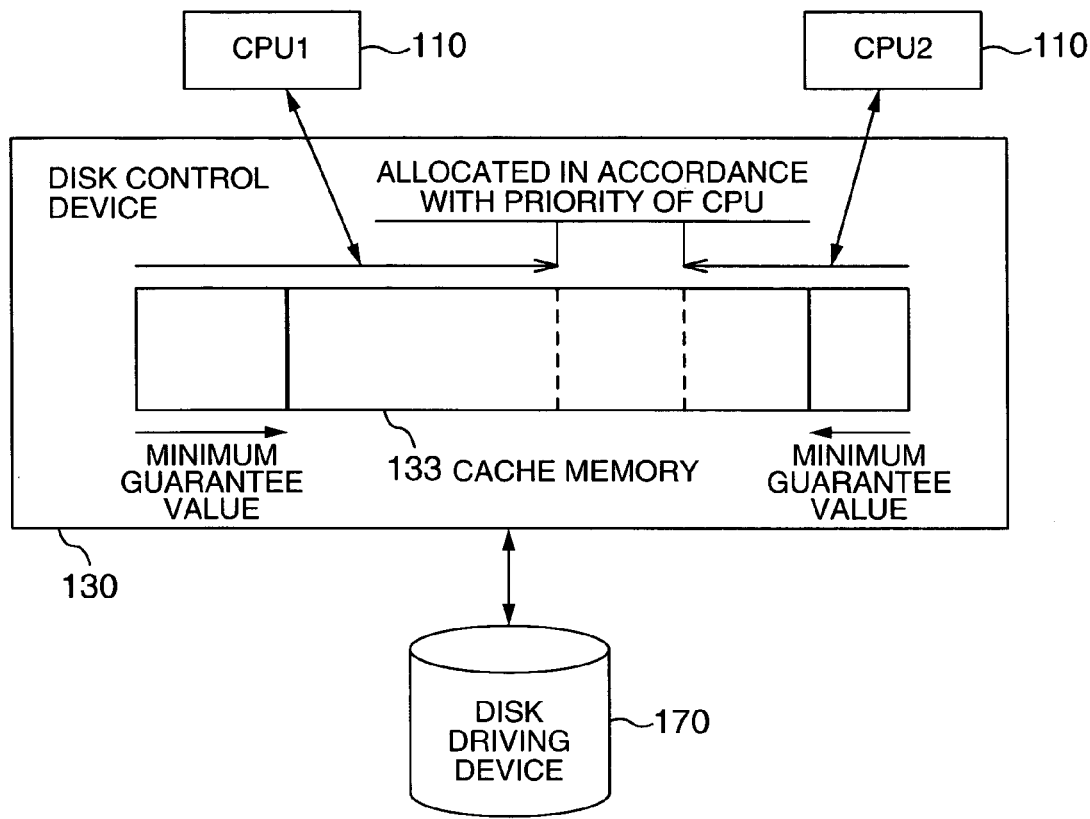
FIG. 23 shows an outline of the invention.

FIG. 23 shows the outline of the invention. The data storage area of the cache memory 133 provided to the disk controller 130 connected to the two hosts (CPU) 110 is constituted by a plurality of cache slots each having a predetermined size. Priority determining in advance a priority order of securing the storage area inside the cache memory is allocated to each host 110, and the number of cache slots is also allocated to each host 110 in accordance with input/output to and from the cache memory 133. A minimum guarantee value expressing in advance the size of a minimum storage area to be secured by the number of cache slots is allocated to each host 110. Even when other host having a higher priority expands the size of the storage area (the number of cache slots), the number of cache slots of the minimum guarantee value is allocated to the host and are secured lest the data accessed by the host is excluded from the cache memory 133.

In the invention, the data storage area inside the cache memory 133 is managed in the unit of the cache slot having a predetermined size. Therefore, the distribution of the data storage area corresponding to each host changes in the unit of the cache slot in accordance with input/output to and from the cache memory 133. The distribution of a plurality of cache slots within the range of the minimum guarantee value changes in the unit of the cache slot, too. In other words, the number of the minimum guarantee value of the cache slots is secured either always or at minimum in whichever way a plurality of cache slots may be distributed. For example, even when the data quantity is small as in the initial stage, the number of cache slots corresponding to the minimum guarantee value is secured. In other words, the number of cache slots of the minimum guarantee value is not practically allocated as the storage area in the invention but only the minimum guarantee value as the number of cache slots to be minimum secured is set and control is so made as to secure this number.

In the environment in which a plurality of hosts are connected to the same storage device, control for allocating a priority to a specific host is sometimes effective. In a system configuration in which different hosts execute batch work and on-line work and each host uses in common the same storage device, the on-line work is not retarded when a priority of input/output is allocated to the host of the on-line work. This invention executes control of the cache slots so that the data from the path (computer) having a priority is much arranged inside the cache memory and can in this way distinct the processing time of the input/output request for each path. The cache memory quantity can be flexibly controlled by conducting reference/updating of control information (priority, minimum guarantee value, schedule definition) of the cache memory quantity in accordance with an external instruction. For example, the control information of the cache memory quantity (later-appearing priority, minimum guarantee quantity, schedule definition) can be set from the control terminal 190 or from any of a plurality of hosts 110.

Figure 2:
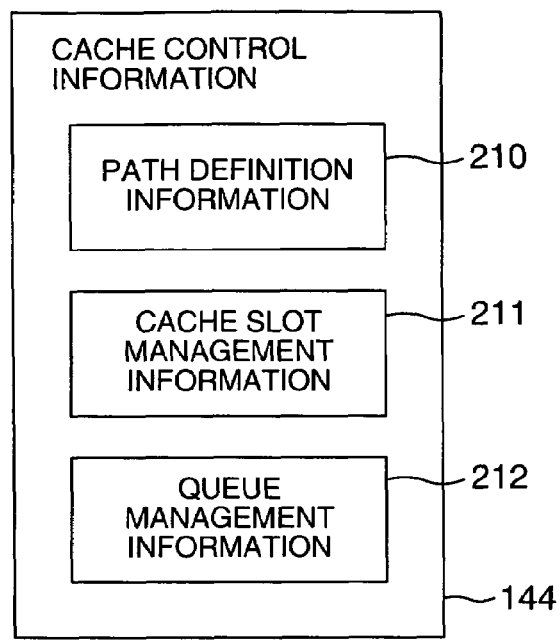
FIG. 2 is a detailed view of cache control information 144.

FIG. 2 is a detailed view of the cache control information 144.

The cache control information 144 includes path definition information 210, cache slot management information 211 and queue management information 212.

Figure 3:
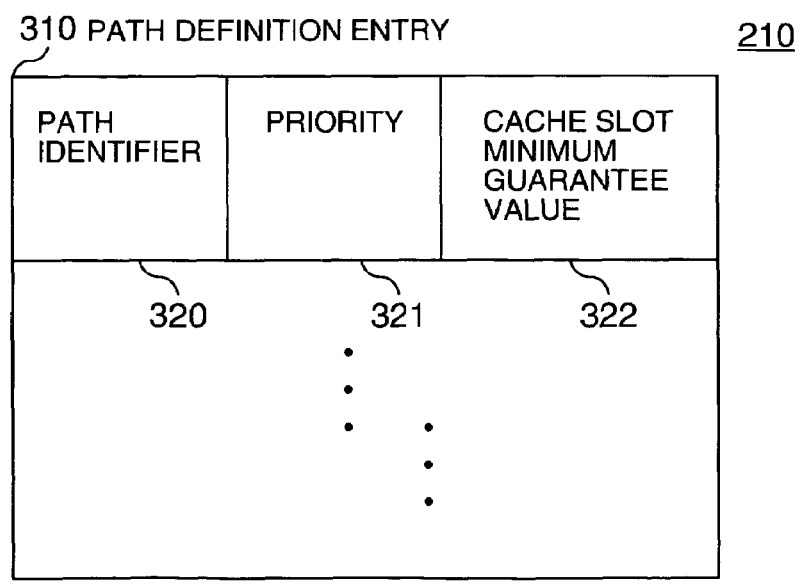
FIG. 3 is a detailed view of path definition information 210.

FIG. 3 is a detailed view of the path definition information 210.

The path definition information 210 has a plurality of path definition entries 310. The path definition entry 310 includes a path identifier 320, a priority 321 and a cache slot minimum guarantee value 322. Since the path between the host 110 and the disk controller 130 is one each for each host in this embodiment, the path identifier 320 has the meaning of an identifier for discriminating the host 110, too. The path and the host correspond to each other on the 1:1 basis to simplify the explanation.

The path definition information 210 can be looked up and updated by the input/output request from the application 111 on the host 110 or the management program 194 on the control terminal 190.

The path identifier 320 is information for identifying the queue of the cache slots constituting the data storage area of the cache memory. The queue of the cache slots has a link structure in which the cache slots are linked with one another in the sequence of allocation. The number of queues is the number of hosts plus 1 because an invalid cache slot (a cache slot which does not store effective data and is an object for securing a new area) must be managed besides identification of each host.

The information for identifying the host making the input/output request indicates a path group identifier, a host identifier, etc, for example, and any information may be used so long as it can primarily identify the host.

The priority 321 indicates a preferential order of using the cache slots 150 among different hosts and may be a unique value for all the hosts, or a plurality of hosts having the same priority may exist. The priority among the hosts can be changed by the external instruction in accordance with the operation condition. However, the priority 321 of the path identifier for managing the invalid cache slot is a fixed value and is the lowest among all the priorities. When the priority is provided, the content of the cache slot 150 under use is not easily excluded by the host having a lower priority when the input/output is made from the host having a higher priority. Since the priority 321 of the path identifier for managing the invalid cache slot is the lowest, it becomes possible to reduce as much as possible the invalid cache slots and to effectively utilize the cache memory.

The cache slot minimum guarantee value 322 is the minimum number of cache slot identifiers that the queue can hold. The cache slot minimum guarantee value 322 can be changed by the external instruction in accordance with the operation condition. However, the cache slot minimum guarantee value 322 of the path identifier for managing the invalid cache slot is fixed and the slot number minimum guaranteed does not exist.

Since the cache slot minimum guarantee value 322 is set for each host, the minimum necessary cache memory capacity the host can utilize is secured. Since the slot number of the invalid cache slot minimum guaranteed is eliminated, the number of invalid cache slots can be as much as reduced and the cache memory can be effectively utilized.

Figure 4:
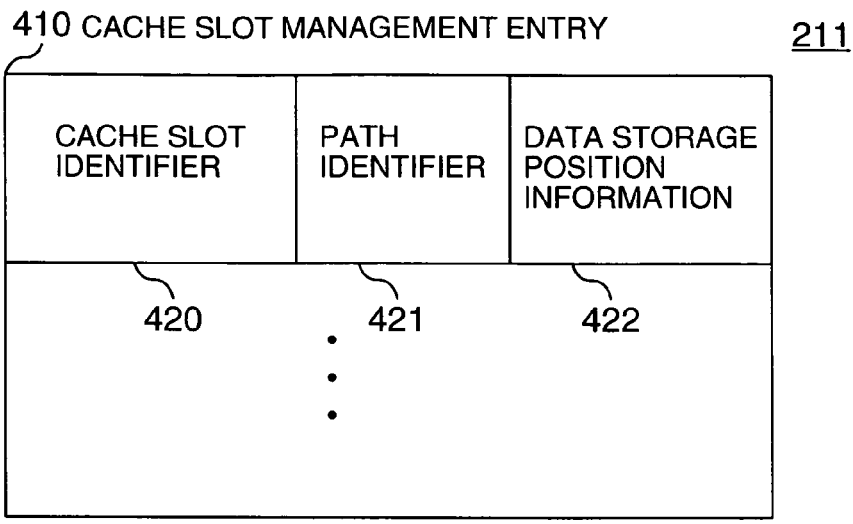
FIG. 4 is a detailed view of slot management information 211.

FIG. 4 is a detailed view of the cache slot management information 211.

The cache slot management information 211 holds the state of each cache slot 150. The cache slot information 211 has a plurality of cache slot management entries 410. The state of one cache slot 150 is set to the cache slot management information 410. The cache slot management entry 410 has a cache slot identifier 420 and a path identifier 421. The cache slot identifier 420 is information for primarily identifying the cache slot 150. The path identifier 421 is information representing the input/output requesting host using the cache slot 150 or the invalid cache slot and is the same information as the cache identifier 320. Data storage position information 422 is information representing the storage position of the data 172 stored in the cache slot represented by the cache slot identifier 420. The data storage position information 422 may be of any type so long as it primarily represents the storage position in the logical volume such as the logical address, the sector number, the cluster number, and so forth.

Figure 5:
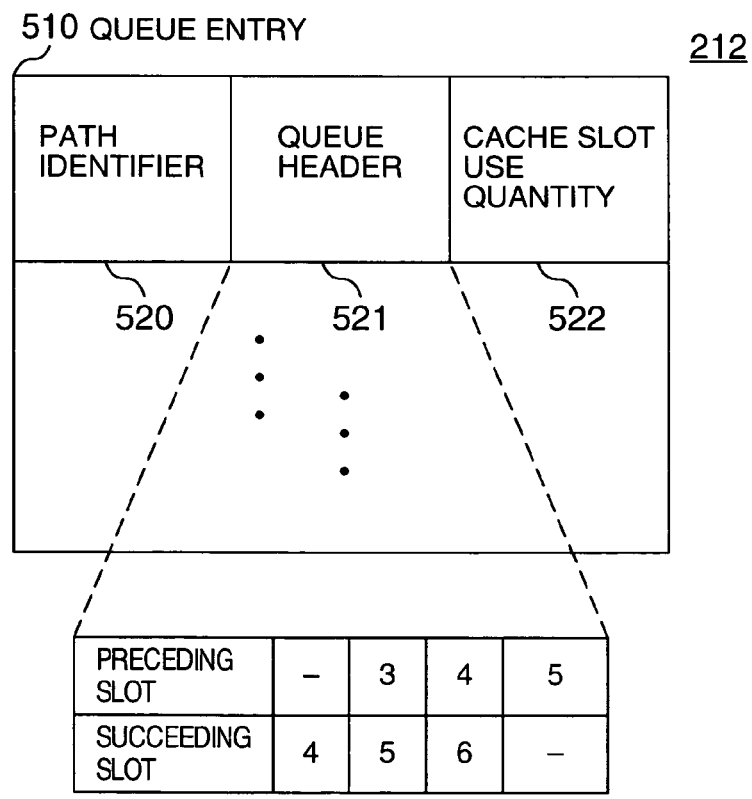
FIG. 5 is a detailed view of queue management information 212.

FIG. 5 is a detailed view of queue management information 212.

The queue management information 212 has a plurality of queue entries 510. A queue of the cache slot used for each input/output requesting host or a queue for managing the invalid cache slot is set to one queue entry 510. The path information 520 is information for identifying the queue for managing the input/output requesting host for the invalid cache slot. When the cache slot is allocated to the input/output requesting host, the same information as the path identifier 320 is stored in the path identifier 520 and in the case of the invalid cache slot, the information that does not coincide with any path identifier information is stored. A queue header 521 represents the information of one queue and there are the case where it has a plurality of cache slot identifiers 420 and the case where it does not hold the cache slot identifier 420 (the case of invalid cache slot). Cache slot use quantity 522 is information representing the number of cache slots the queue has.

When one queue has a plurality of cache slot identifiers 420, the queue header 521 stores information representing the link structure constituted by a plurality of cache slots constituting the queue. In other words, the queue header 521 stores the information representing the connection relation among a plurality of cache slot identifiers 420 in the queue. In this connection relation, the cache slot identifiers 420 are linked in the order of allocation of the cache slots. Therefore, the data of the cache slot positioned at the leading position of the queue is old and the data of the cache slot positioned at the tail is new. As shown in FIG. 5, the queue header 521 serially stores the cache slot identifiers 420 of the cache slots connected ahead and after this cache slot. The information of the connection relation shown in FIG. represents the link structure that corresponds to the queue B shown in later-appearing FIG. 13. Incidentally, the previous slot of the leading cache slot stores "-" and the slot after the last cache slot stores "-".

FIG. 6 shows in detail the schedule definition information 145.

The schedule definition information 145 has a plurality of schedule definition entries 610 for setting scheduling of the path definition. The schedule definition entry 610 has data 620, time 621 and new path definition information 622. A schedule execution processing 146 monitors the internal timer 134 and rewrites the existing path definition information 210 to new path definition information 622 when the data and the time reach predetermined date 620 and time 621.

The schedule definition information 145 is the information that the schedule execution processing 146 looks up.

The schedule execution processing 146 monitors the internal timer 134 and updates the cache control information 144 when the time registered to the schedule definition information 145 is reached. Because the cache control information 144 is updated at the specific time, the access control from the host 110 can be flexibly made.

Next, input/output in the system shown in FIG. 1 will be explained.

The objects of the input/output request in the invention are two kinds, that is, the logical volume 171 and control information 142. The input/output having the logical volume 171 as the object is input/output for reading/writing the data inside the logical volume. On the other hand, the input/output to and from the control information 142 exists as means for operating from outside the control information in the invention.

Figure 7:
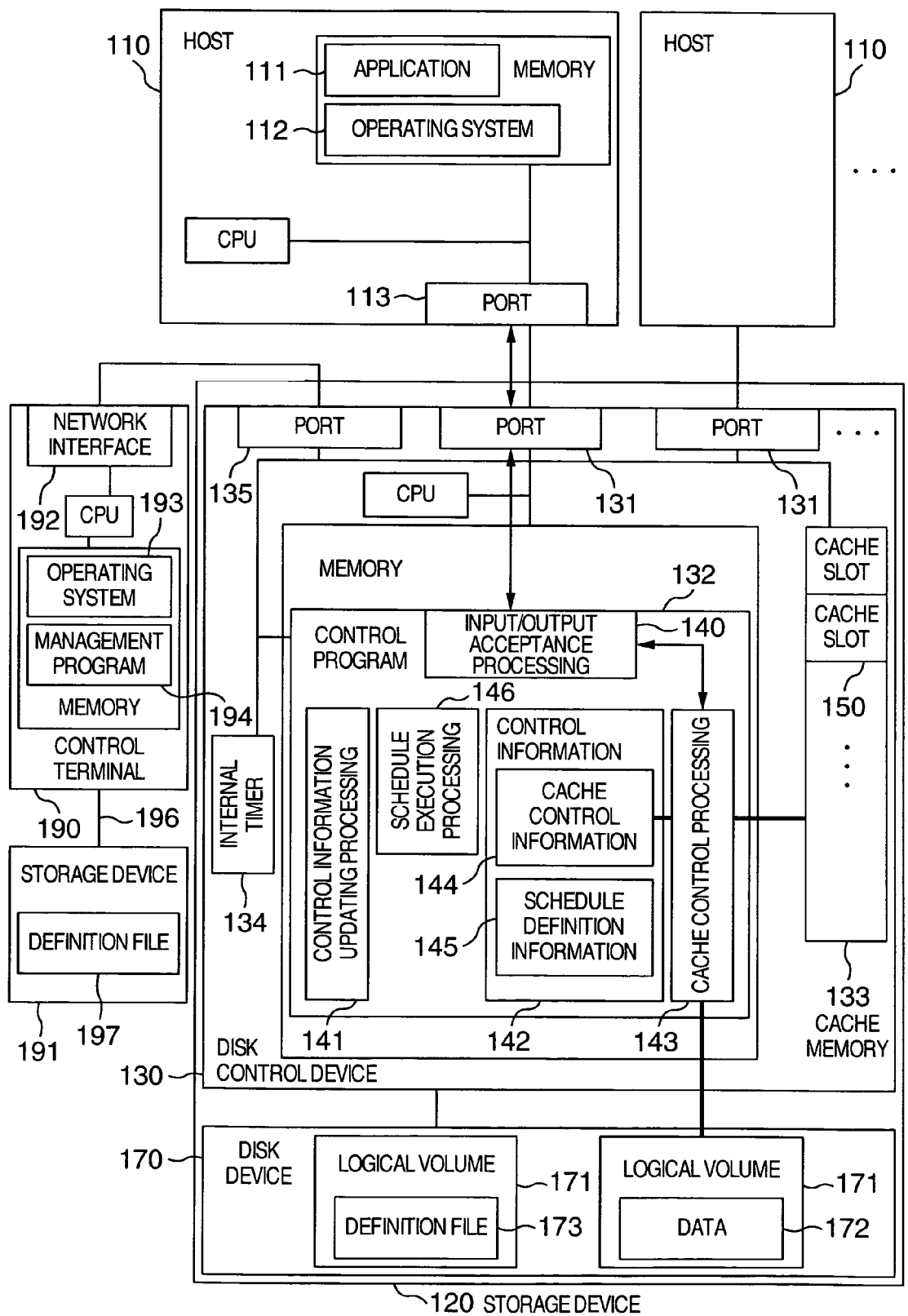
FIG. 7 shows a flow of input/output to and from a logical volume.

FIG. 7 shows the flow of the input/output to and from the logical volume 171.

The input/output request from the application 111 operating on the host 10 is transferred to the storage device 120 through the operating system 112 and the port 113.

The input/output request reaching the storage device 120 is accepted by the port 131 and is transferred to the control program 132.

The input/output acceptance processing 140 accepts the input/output request from the port 131. The input/output acceptance processing 140 then judges and assorts the input/output request. When the object of the input/output request is the control information 142, the input/output request is transferred to the control information updating processing 141.

The cache control processing 143 is a program for controlling the cache memory 133. The program looks up and updates the cache control information 143 and the cache memory 133, gains access to the logical volume 171, whenever necessary, and executes the input/output request.

After the execution of the input/output request is complete, the input/output completion is reported to the application 111 in the reverse sequence to that of the acceptance.

Figure 8:
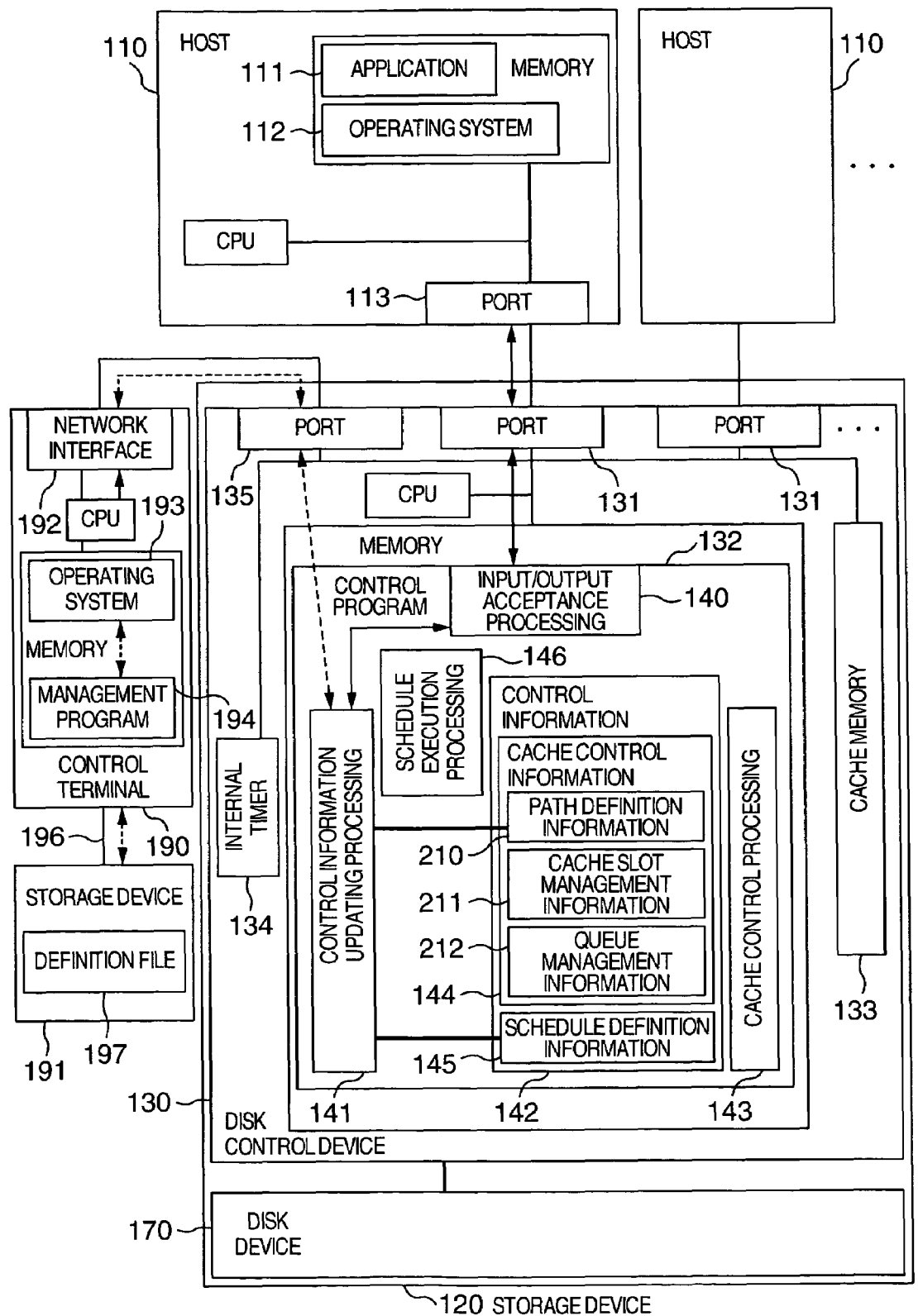
FIG. 8 shows a flow of input/output to and from control information 142.

FIG. 8 shows the flow of the input/output request processing to and from the control information 142.

The input/output request to and from the control information 142 is executed by the application 111 operating on the host 110 or the control terminal 190 or by the management program 194. When the application 111 outputs the input/output request to the control information 142, the input/output request is transferred to the input/output acceptance processing 140 through the operating system 112, the port 113 and the port 131 in the same way as the input/output to and from the logical volume 171. The input/output acceptance processing 140 judges the input/output request and assorts it to the control information updating processing 141 when it is the input/output to the information control 142. The control information updating processing 141 looks up and updates the path definition information 210 inside the cache control information 144 or the date 620, the time 621 and the new path definition information 622 inside the schedule definition information 145.

After updating of the control information 142 is complete, the input/output completion is reported to the application 111 in the reverse sequence to the input/output acceptance.

When the management program 194 outputs the input/output request to the control information 142, the input/output request is transferred to the control information updating processing 141 through the operating system 193, the network interface 192 and the port 135. The subsequent operation is the same as the input/output operation requested by the application 111. The operation not dependent on the operating condition of the host 110 can be made when the management program 194 operating on the control terminal 190 looks up and updates the path definition information 210 and the schedule definition information 145.

Incidentally, those kinds of information which the application 111 and the management program 194 acquire from the path definition information 210 and the schedule definition information can be stored as a definition file when the input/output to the logical volume 171 or the storage device 191 is executed. The application 111 and the management program 194 can execute input/output to and from the control information 142 on the basis of the definition file 173 and the definition file 197. The control information can be updated from various computers when the definition file 173 and the definition file 197 are copied or are allowed to be looked up from other computers.

Figure 9:
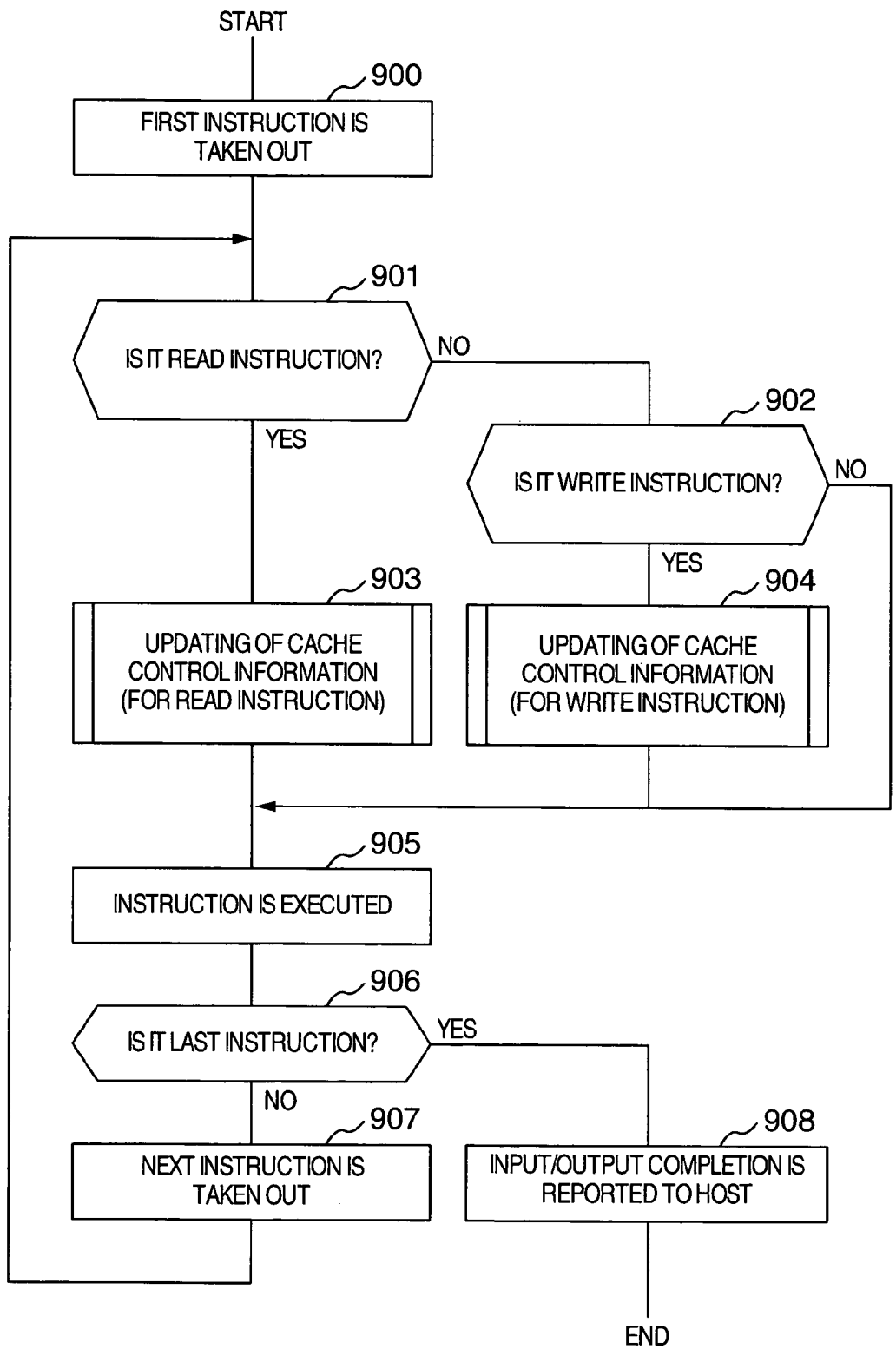
FIG. 9 shows an operation of a cache control portion 143 when an input/output request to a logical volume 171 is accepted.

FIG. 9 is a flowchart showing the operation of the cache control processing 143 when the input/output request to the logical volume 171 is accepted.

After the input/output request to the volume is accepted, the cache control processing 143 takes out the first instruction (Step 900) and judges the kind of the instruction (Steps 901 and 902). When the instruction is a read instruction or a write instruction, the cache control processing 143 executes the updating processing of the cache control information (Steps 903 and 904). The operation of the cache control information updating processing is different between the read instruction and the write instruction and the detail will be described later. Thereafter, the read or write instruction of the data is executed (Step 905) and the operations from Step 901 to Step 905 are repeated to the last instruction (Steps 906 and 907). Finally, the input/output completion is reported to the host (Step 908).

Figure 10:
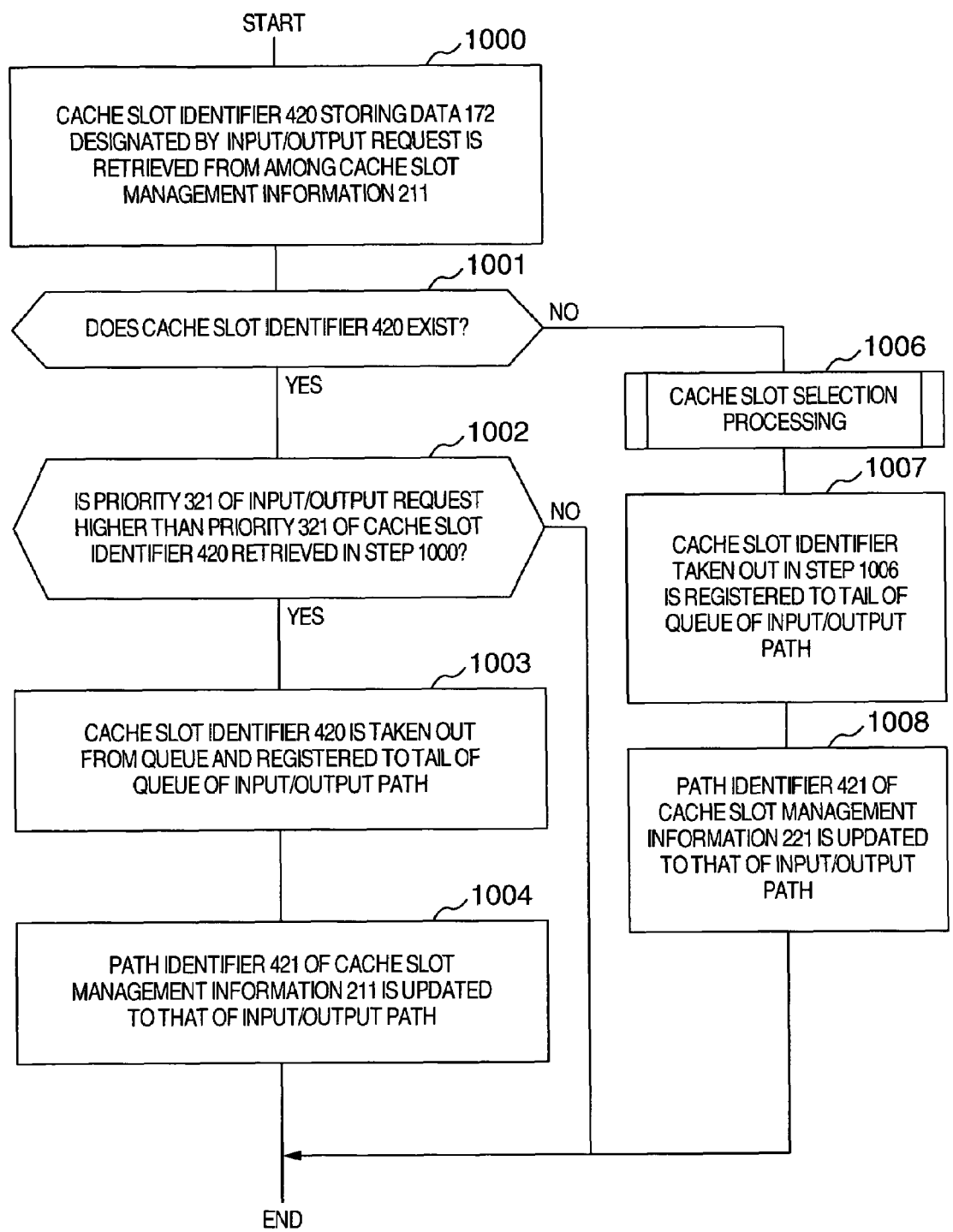
FIG. 10 is a flowchart of a processing operation for updating cache control information when a read instruction is executed.

FIG. 10 is a flowchart of the updating processing 903 of the cache control information for the read instruction shown in FIG. 9.

To judge whether or not the data 172 designated by the input/output request exists on the cache memory 133, the cache slot identifier 420 in which the data designated by the input/output request is stored is retrieved (Step 1000). The information representing the correspondence relation between the data 172 and the cache slot identifier 420 of the cache slot storing the data and necessary for this retrieval is stored in the cache slot management information 211 shown in FIG. 4.

When the data on the cache memory 133 represented by the cache slot identifier 420 in the cache slot management information 211 is coincident with the data 172, the data 172 is judged as existing on the cache memory 133 (Step 1001).

Next, the path definition entry 310 in which the input/output path information added to the input/output request is coincident with the path identifier 320 in the path definition information 210 is retrieved and whether or not the priority 321 in the path definition entry 310 retrieved is higher than the priority 321 of the cache slot retrieved in Step 1000 is judged (Step 1002). When the priority 321 in the path definition entry 310 retrieved is higher than the priority 321 of the cache slot retrieved in Step 1000, the cache slot of the cache slot identifier retrieved in Step 1000 is taken out from the queue and is registered to the tail of the queue corresponding to the input/output path (Step 1003) and the path identifier 421 of the cache slot management information 211 is updated to that of the input/output request (Step 1004).

In Step 1002, when the priority 321 in the path definition entry 310 retrieved is not judged as being higher than the priority 321 of the cache slot retrieved in Step 100, nothing is done and the priority 321 corresponding to the data 172 existing on the cache memory 133 becomes the priority 321 in the path definition entry 310 retrieved.

When the data 172 designated by the input/output request does not exist on the cache memory 133, that is, when the data on the cache memory 133 represented by the cache slot identifier 420 does not coincide with the data 172, a cache slot selection processing is executed (Step 1006). In the cache slot selection processing, a processing that selects the cache slot for saving the content of the invalid cache slot or the cache memory to the logical volume and takes out the cache slot identifier for reading out afresh from the queue is executed. The cache slot selected in Step 1006 is registered to the tail of the queue coincident with the input/output path identifier (Step 1007) and the path identifier 421 of the cache slot management information 221 is updated to that of the input/output path (Step 1008).

Figure 11:
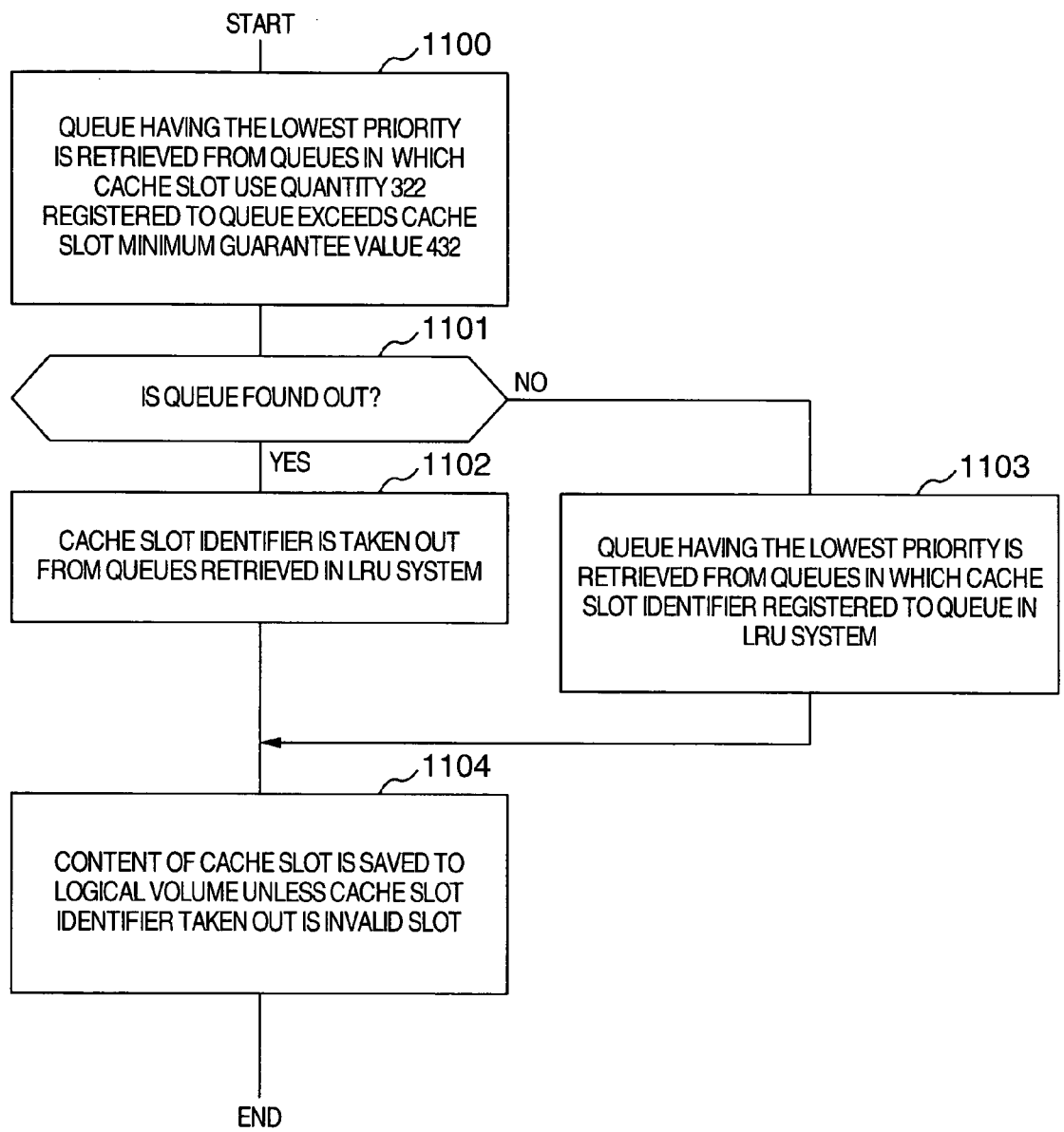
FIG. 11 is a flowchart showing an operation of a slot selection processing.

FIG. 11 is a flowchart showing the operation of the cache slot selection processing 1006 shown in FIG. 10.

The cache slot use quantity 522 of the queue registered to the queue header 521 decided by the path identifier 520 in the queue entry 510 of the queue management information 212 is compared with the cache slot minimum guarantee value 322 decided by the path identifier 320 in the path definition entry 310 in the path definition information 210. As a result, the input/output path having the lowest priority 321 among the input/output paths the cache slot use quantity 522 of which exceeds the cache slot minimum guarantee quantity 322 is retrieved from the path definition information 210 (Steps 1100 and 1101). When the input/output path the cache slot use quantity 522 of which exceeds the cache slot minimum guarantee value 322 is found out, the cache slot identifier is taken out in the LRU (Least Recently Used) system from the queue retrieved in Step 1100 (Step 1102). When such an input/output path is not found out, the cache slot identifier is taken out in the LRU system from the queue having the lowest priority among the queues to which the cache slot identifier is registered (Step 1103).

Unless the cache slot taken out by the processing described above is the invalid cache slot, the data on the cache memory is written to the logical volume (Step 1104) and this cache slot is used as the cache slot to be used in the subsequent processing.

Figure 12:
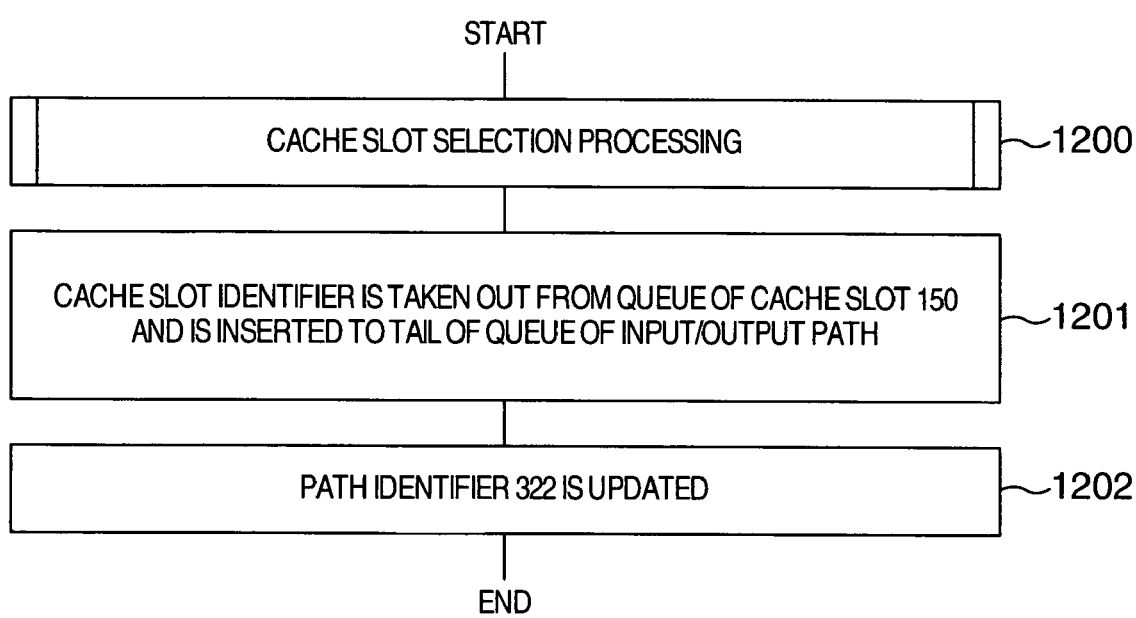
FIG. 12 is a flowchart of a processing operation for updating cache control information when a write instruction is executed.

FIG. 12 is a flowchart showing the operation of the write processing 904 shown in FIG. 9. To write the data designated by the input/output request to the cache in the write processing, the cache slot selection processing described above for saving the content written to the cache slot is executed (Step 1200). The cache slot identifier is taken out from the queue of the cache slot 150 selected in Step 1200 and is inserted to the tail of the queue corresponding to the input/output path (Step 1201). Furthermore, the path identifier 320 is updated to the input/output path information (Step 1202) to display that this cache slot is used in the input/output path.

An embodiment of the input/output to the logical volume in the invention will be explained with reference to FIGS. 13 to 18.

Figures 13A, 13B, 13C:
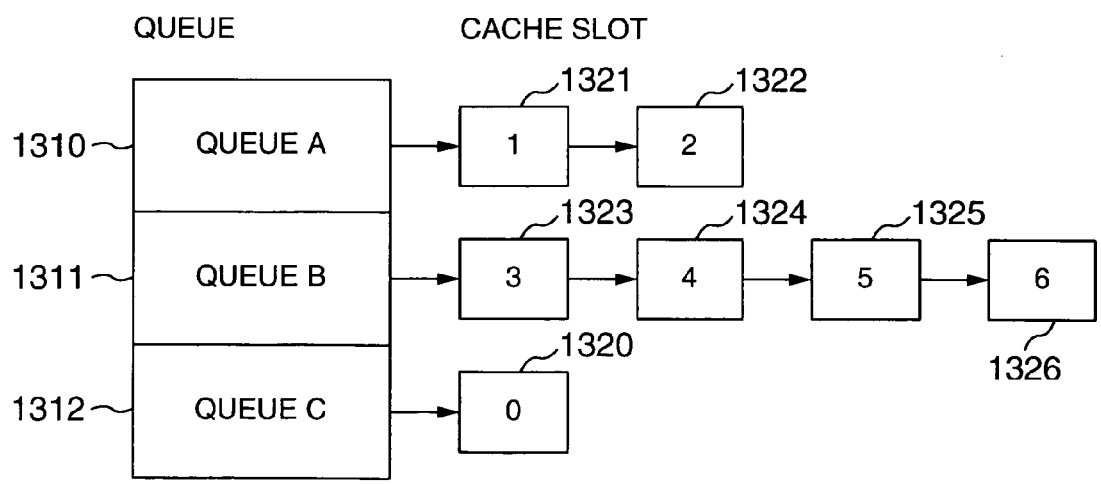
FIGS. 13A to 13C show an embodiment of path information and queue information.

FIG. 13 shows an embodiment of path definition information 210 (FIG. 13A) and queue management information (FIG. 13B).

In this embodiment, the hosts A and B are connected to the disk device. The path identifier 1300 is "host A" and "host B", respectively. The path definition entry in which the path identifier 1300 is "invalid" manages the invalid cache slots that do not belong to any path (hereinafter called "invalid entry"). The priority 1301 having a lower numerical value has a higher priority in this embodiment. The priority 1301 of the invalid entry is the lowest among all the priorities and the cache slot minimum guarantee value 1302 of the invalid entry is 0.

The cache slot use quantity 1305 is decided depending on the condition of the queue. The queue header 1304 of the hosts A and B and the invalid entry represents the queue A, the queue B and the queue C, respectively. Each queue has a cache slot identifier shown in FIG. 13C). The queue 1310 has cache slot identifiers "1" and "2". The queue 1311 has cache slot identifiers "3", "4", "5" and "6". The queue 1312 manages the cache slot identifier of the invalid entry. The queue 1310 has the cache slot identifier "0".

Figure 24:
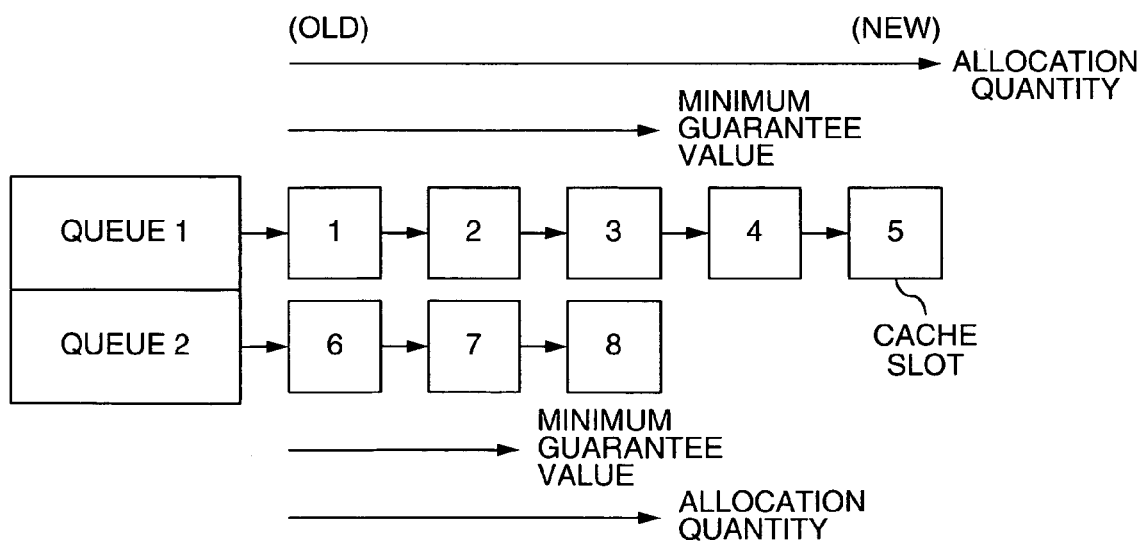
FIG. 24 shows a construction of an allocated storage area in a queue.

FIG. 24 shows the relation between the number of cache slots allocated to each queue and the cache slot minimum guarantee value 322. The cache slots are serially linked in each queue and the cache at the start is old and a new cache slot is linked to the tail.

The link structure of the cache slots shown in FIGS. 13 and 24 can be accomplished by adding the cache slot identifier of the cache slot linked before and after the cache slot as shown in the queue entry 510 of FIG. 5.

FIG. 14 shows an embodiment of the cache slot management information 211.

It will be assumed that the cache memory 133 is equally divided, each has cache slot identifiers "0" to "6" and each cache slot identifier primarily decides the data address on the cache memory 133. This embodiment uses the logical volume identifier and the logical address as data storage position information 1402.

For example, it will be assumed that the cache slots having the cache slot identifiers of "0" to "6" in the sequence of the data address of a smaller value on the cache memory 133 are stored. The data address designated by the cache slot identifier "0" on the cache memory 133 is the address that does not use any path and the path identifier is "invalid". Similarly, the cache slot identifiers "1" and "2" represent the data addresses on the cache memory that the path identifier "host A" uses, and the cache slot identifiers "3", "4", "5" and "6" represent the data addresses on the cache memory that the path identifier "host B" uses.

As for the logical address, too, it will be assumed that the cache slot identifier "0" is "invalid" and the cache slot identifiers "1" to "6" are "ADR1" to "ADR6", respectively. As for the logical volume identifier, it will be assumed further that the cache slot identifier "0" is "invalid" and all the others are "VOL0".

FIG. 15 shows an embodiment of an input/output request directed to the logical volume.

Figure 15A:
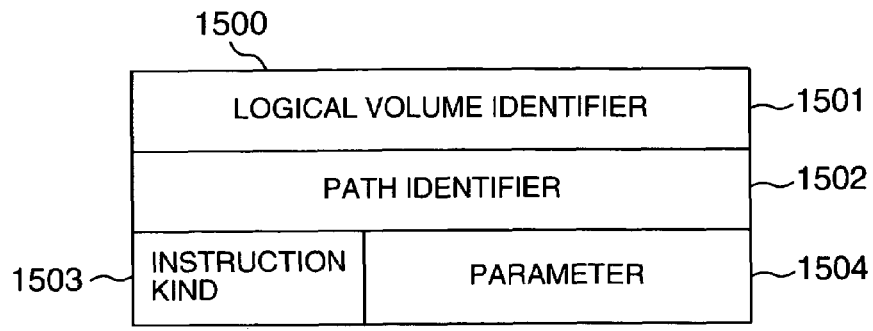
FIGS. 15A to 15D show an embodiment of input/output using a logical volume as an object.

The input/output 1500 shown in FIG. 15A has a logical volume identifier 1501, a path identifier 1502, an instruction 1503 and a parameter 1504. The logical volume identifier

1501 is information that primarily identifies the input/output object device. The instruction 1503 is an instruction kind such as read/write/control and the parameter 1504 is the information used for the instruction 1503. The parameter 1504 is the information used for the instruction 1503 and is control information such as the logical address as the input/output object and magnetic head positioning. Other information may be used depending on the kind of the input/output object device.

Figure 15B:
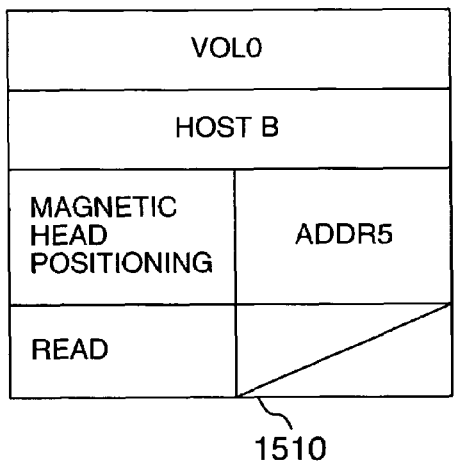
Figure 15C:
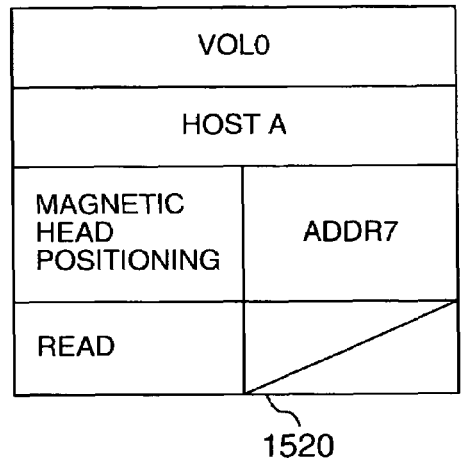
Figure 15D:
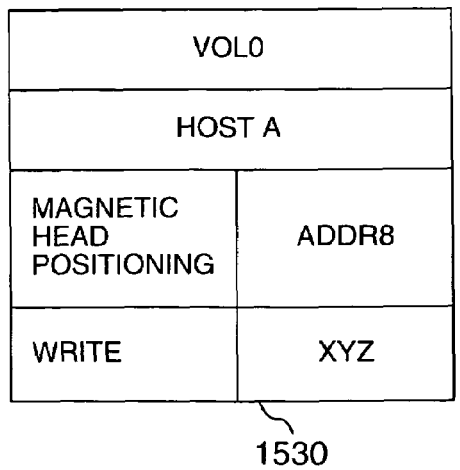

The input/output 1510 shown in FIG. 15B is the one that is requested by the host of the path identifier "host B" and is for reading the logical address "ADDR5" on the logical volume identifier "VOL0". The input/output 1520 shown in FIG. 15C is the one that is requested by the host of the path identifier "host A" and is for reading the logical address "ADDR7" on the logical volume identifier "VOL0". The input/output 1530 shown in FIG. 15D is the one that is requested by the host of the path identifier "host A" and is for writing the data "XYZ" to the logical address "ADDR8" on the logical volume identifier "VOL0".

FIG. 16 shows an operation flow of the cache control processing 143 when the input/output 1510 (read; data exits on cache) shown in FIG. 15B is executed. First, the magnetic head positioning instruction is taken out (Step 1600) and the magnetic head is positioned to the position designated by the parameter (Step 1601). Next, the subsequent instruction (read instruction) is taken out (Step 1602) and the read processing is executed (Step 1603). Since the data exists on the cache in this case, read of the data from the actual medium is not executed and the data is read from the cache in the subsequent processing.

First, to acquire the cache that holds the object data, the data storage position information 422 representing the corresponding relation between the data and the cache slot identifier, that is described in Step 1000 in FIG. 10 and is held in the cache slot management information 211 shown in FIG. 4, is retrieved (Step 1604) and the cache slot having the logical address "ADDR5" as the read object is acquired. It will be assumed hereby that the cache slot having the cache slot identifier "5" is acquired. The content of the cache slot of the cache slot identifier "5" is transferred to the host B (Step 1605). Finally, input/output completion is reported to the host B (Step 1606).

FIG. 17 shows an operation flow when the input/output 1520 (read; no data exists on cache) shown in FIG. 15C is executed. Steps 1700 to 1702 are the same as those of the case of the input/output 1510 (read; data exists on cache) shown in FIG. 16 but the following processing is executed in Step 1703 because the data does not exist on the cache.

First, a cache slot search processing is executed to acquire the cache to which the data is to be saved (Step 1704). In this processing, the cache slot of the cache slot identifier "0" that does not belong to any path and is an invalid cache slot is selected. The cache slot of the cache slot identifier "0" is taken out from the queue C and is inserted to the tail of the queue A of the cache slot used by the path identifier "host A" (Step 1704). Furthermore, the data read from the volume identifier "VOL0" and the logical address "ADDR7" is transferred to the cache slot of the cache slot identifier "0" (Step 1705) and the content of the cache slot of the cache slot identifier "0" is transferred to the host (Step 1706). The cache slot use quantity used by the path identifier "host A" is thereafter updated (Step 1707) and the logical volume identifier, the logical address and the path identifier are updated to "VOL0", "ADDR8" and "host A", respectively (Step 1708). Finally, input/output completion is reported to the host A (Step 1709).

FIG. 18 shows an operation flow of the cache control processing 143 when the input/output 1530 (write) shown in FIG. 15D) is executed. Steps 1800 to 1802 are the same as those of the input/output 1510 shown in FIG. 16. In this case, too, the queue and the path identifier are updated in the same way as read. The updating sequence is as follows.

First, the cache slot search processing is executed to acquire the cache to which the data is to be saved (Step 1803). In this processing, the cache slot of the cache slot identifier "0" that is the invalid cache slot not belonging to any path is selected. The cache slot of the cache slot identifier "0" is taken out from the queue C and is inserted to the queue A of the cache slot used by the path identifier "host A" (Step 1804). The cache slot use quantity used by the path identifier "host A" is updated (Step 1805).

The logical volume identifier, the logical address and the path identifier are updated to "VOL0", "ADDR8" and "host A", respectively (Step 1806) and the data "XYZ" is transferred to the cache memory positioned by the cache slot of the cache slot identifier "0" (Step 1807). Finally, input/output completion is reported to the host A (Step 1808).

The use quantity of the cache memory can be controlled for each input/output path when the cache slot is controlled in the manner described above.

An embodiment of input/output to the control information 142 in the invention will be explained. In the input/output to the control information 142, it is possible to change the priority and the cache slot minimum guarantee value, to add and delete the path definition entry and to change the schedule definition inside the cache control information 144 and the schedule definition information 145. FIG. 19 shows the embodiment of the input/output to the control information 142.

The input/output for changing the priority shown in FIG. 19A includes an instruction kind 1900, a path identifier 1901 and a priority 1902. This embodiment represents the input/output for changing the priority of the path definition entry 310 having the path identifier "host A" to "1". When the application requires this input/output, the control information updating processing 141 searches the path definition information 210 and updates the priority when the path definition entry having the path identifier "host A" exists. When it does not exist, the input/output request is regarded as an input/output error.

The input/output for changing the cache slot minimum guarantee value shown in FIG. 19B includes an instruction kind 1910, a path identifier 1911 and a cache slot minimum guarantee value 1912. This embodiment represents the input/output for changing the cache slot minimum guarantee value of the path definition entry having the path identifier "host A" to "2". When the application requires this input/output, the control information updating processing 141 searches the path definition information 210 and updates the cache slot minimum guarantee value inside the path definition entry when the path definition entry having the path identifier "host A" exists. When it does not exist, the input/output request is regarded as an input/output error.

The input/output for adding the path definition entry shown in FIG. 19C includes an instruction kind 1920, a path identifier 1921, a cache slot minimum guarantee value 1922 and a cache slot minimum guarantee value 1923. This embodiment represents the input/output for adding the path definition entry having the path identifier "host A" and the cache slot minimum guarantee value "2". When the application requires such an input/output, the control information updating processing 141 searches the path definition information 210 and adds the path definition entry when the path definition entry having the path identifier "host A" does not exist. When it exists, the input/output request is regarded as an input/output error.

The input/output for deleting the path definition entry shown in FIG. 19D includes an instruction kind 1930 and a path identifier 1931. This embodiment represents the input/output for deleting the path definition entry having the path identifier "host A". When the application requires such an input/output, the control information updating processing 141 searches the path definition information 210 and deletes the path definition entry when the path definition entry having the path identifier "host A" exists. When it does not exist, the input/output request is regarded as an input/output error.

The control information can be set in the manner described above from the host or the application on the control terminal. When the control information is set from the application 194 on the control terminal 190, the operation not depending on the operating condition of the host becomes possible.

The control method described so far prepares the queue for each input/output path. However, only some specific hosts among a large number of hosts connected to the storage device can preferentially utilize the cache memory by setting the same priority to the plurality of hosts.

FIG. 20 shows an embodiment of the path definition information 210.

FIG. 20A shows that a host A, a host B and a host C are connected to the disk device. Here, the host B and the host C have the same number of priority 2001. To avoid collision of the access having the same priority in such a case, the queue of the host B and the host C is shared. To share the queue and to facilitate control of the cache slots, the cache slot minimum guarantee values 2002 of all the paths sharing the queue, the cache slot use quantities 2004 of the queue entries shown in FIG. 20B and the queue header 2005 are set to the same values. In other words, control is made so that the cache slot minimum guarantee values 2002 of the hosts B and C, the cache slot use quantities 2003 and the queue headers 2004 become the same values.

Figure 21:
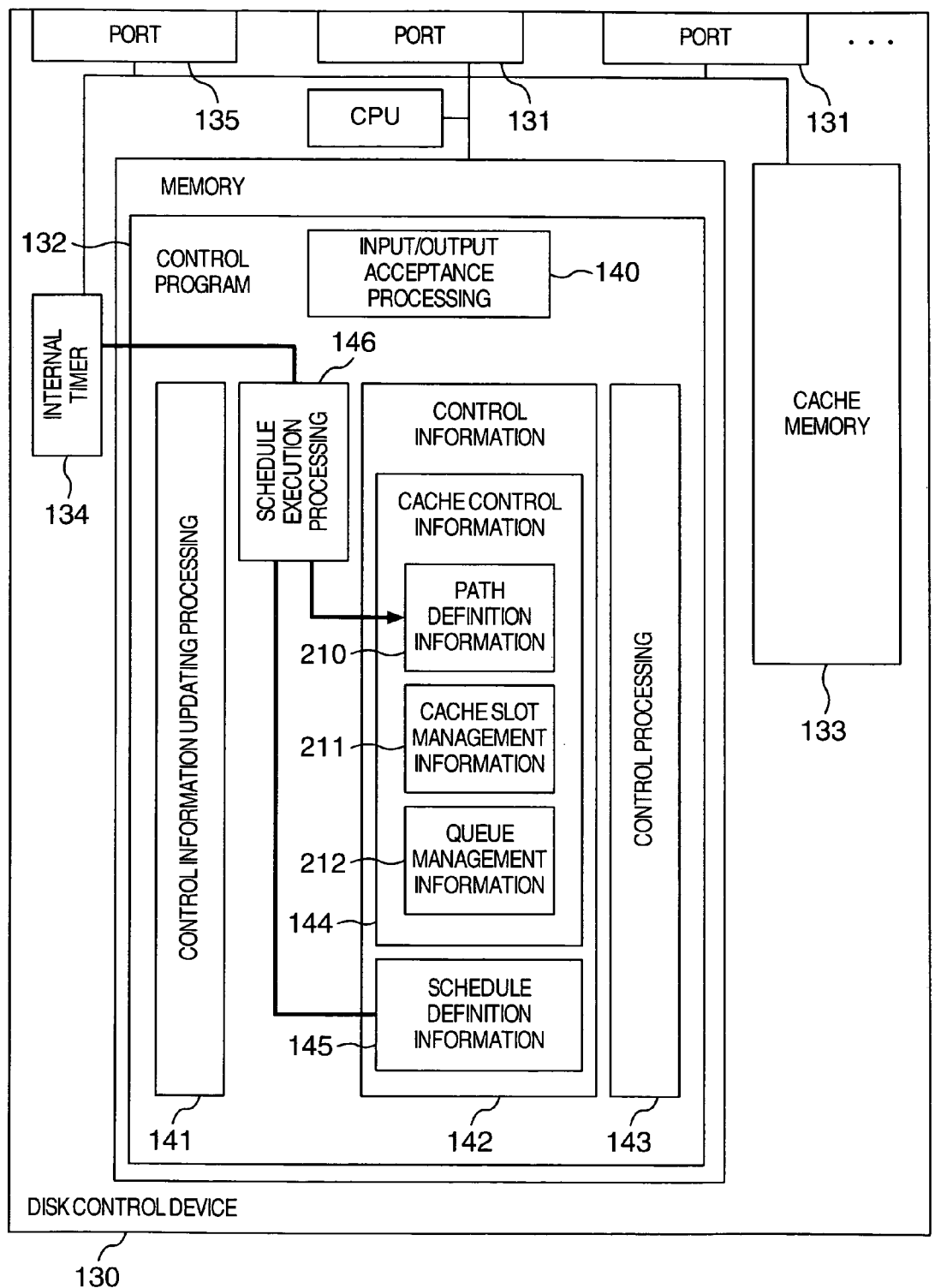
FIG. 21 shows an operation of schedule.

FIG. 21 shows the operation of a schedule.

In the schedule, the cache memory quantity that can be used for each output path is changed at a predetermined time. The schedule is operated in the following sequence.

Schedule definition information 145 is set in advance from the host or the control terminal. FIG. 22 shows an embodiment of the schedule information. Date 2201 can directly designate the month and the day and can also designate "weekday", "holiday", day of the week and month. The values after the change are designated to the path identifier 2202, the priority 2203 and the cache slot minimum guarantee value 2204. In the schedule information of the embodiment, four schedule definition entries are registered and the cache memory quantities that the host A and the host B can utilize are controlled.

When the priority and the cache slot minimum guarantee value 220 of each host are switched to new values at a predetermined time on the basis of the schedule definition, allocation control of the storage area is conducted after that time on the basis of the priority and the minimum guarantee value that are set afresh. The distribution of the storage area corresponding to each host gradually changes from the state before switching of the values and gradually reaches the distribution of the storage area based on the priority and the minimum guarantee value set afresh.

For example, the host A having a higher priority secures a greater number of storage areas than the host B having a lower priority from 8:00 to 20:00 of a weekday as shown in FIG. 22 when the invalid cache slots have already been used up. Since the host B has a higher priority than the host A after 22:00, however, the storage areas secured by the host A gradually shift to the storage areas of the host B. In this instance, the data of a part of the storage areas secured by the host A is written out from the cache memory to the disk device and becomes thereafter the storage area of the host B. On the other hand, since the minimum guarantee value of the host increases from "3" to "5" with 20:00 as the boundary, the number of cache slots minimum guaranteed increases while the minimum guarantee value of the host B decreases from "4" to "2". Consequently, the number of cache slots minimum guaranteed decreases.

In the definition of scheduling described above, control is made in such a manner that the sum of the minimum guarantee value of each path identifier is smaller than the total number of the cache slots in each time zone. When the priority of some path identifiers become the same in each time zone in the definition of scheduling described above, control is made so that the queue corresponding to these path identifiers become the same.

The schedule execution processing 146 monitors the internal timer 134 and the schedule definition information 145. When the time set to the schedule definition information 145 is reached, the content of the path definition information 210 is updated. This processing makes it possible to change the information necessary for the cache management at a specific time and to operate more flexibly the disk device.

It is further possible to display the path definition information shown in FIG. 13A and the schedule definition information shown in FIG. 22 on a display device (not shown) of the control terminal 190 and for the user (manager) to interactively set and change the priority, the minimum guarantee value and the schedule definition through an input device (not shown) such as a keyboard.

In the embodiment described above, the size of each cache slot is assumed to be constant but the size of the respective cache slots can be changed in accordance with the processing form of the application 111 of the host 110. For instance, the load of the allocation processing of the cache slots can be reduced by allocating the cache slots in a greater unit than the ordinary unit for the host for processing large quantities of data such as an image processing that uses in many cases a sequential access besides an ordinary random access. When the size of the cache slots is set in the unit of two or four times the ordinary unit when the cache slots are allocated in the unit greater than the ordinary unit, the number management of the cache slots and the use quantity management become easier.

The program for executing the cache control method of the disk device according to the invention described above can be stored in a computer-readable medium and can be executed by reading the program into the memory.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A method for controlling a cache memory of a storage device by a cache controller, the storage device being connected to a plurality of host computers, and the cache memory including a plurality of cache slots for temporarily holding data of the storage device to be accessed by the host computers, comprising the steps of:
- (a) recognizing a priority to each of the host computers;
- (b) recognizing a minimum number of cache slots to each of the host computers;
- (c) receiving an access request for data of the storage device from an access requesting host computer; and
- (d) allocating to the access requesting host computer a cache slot for holding the data thus requested so that allocated cache slots form a queue on a host computer basis, the cache slots in the queue being linked in an order of allocation, wherein, as a cache slot for holding the requested data, a least-recently allocated cache slot of the queue for a lower-priority host computer is reallocated to a most-recently allocated cache slot of the queue for the access requesting host computer, if there exists no free cache slot in the cache memory, and the requested data does not exist in the cache memory, and the priority of the access requesting host computer is higher than that of the lower-priority host computer, and a number of cache slots of the queue for the lower-priority host computer exceeds the minimum number for the lower-priority host computer.

2. The method for according to claim 1, wherein the priority and the minimum number of cache slots of the queue for each of the plurality of host computers are scheduled in advance and are rendered variable in accordance with a time zone.

3. The method for according to claim 2, wherein information for scheduling is set through a control terminal connected to the storage device.

4. The method according to claim 2, wherein a total of the minimum numbers of cache slots of the queues for the plurality of host computers is smaller than a total number of the cache slots in the cache memory.

5. The method according to claim 2, wherein information for scheduling is set by at least one of the host computers.

6. The method according to claim 1, wherein the minimum number of cache slots of the queue is secured to each of the host computers even when an amount of data to be accessed from a host computer does not reach the minimum number.

7. The method according to claim 1, wherein, when at least two of the host computers have a same priority, said at least two host computers are allowed to share a cache slot of the cache memory.

8. The method according to claim 1, wherein the priority and the minimum number of the queue for each of the host computers are set through a control terminal connected to the storage device.

9. The method according to claim 1, wherein a correspondence relationship between each of the cache slots and positional information in the storage device of data held in each of the cache slots is stored in the cache controller.

10. The method according to claim 9, wherein, if there exists a free cache slot in the cache memory, the requested data is allocated to the free cache slot, and then the free cache slot is allocated to a most-recently allocated cache slot of the queue for the access requesting host computer.

11. The method according to claim 1, wherein a lowest priority and a minimum number of zero are set to a queue for free cache slots.

12. The method according to claim 1, wherein, if the requested data requested in a read mode has been held in a cache slot of the queue for another host computer having a priority lower than that of the access requesting host computer, the cache slot thus holding the data is reallocated to the most-recently allocated cache slot of the queue for the access requesting host computer.

13. The method according to claim 1, wherein the cache controller is included in the storage device.

14. The method according to claim 1, wherein the cache controller is included in one of the host computers.

15. The method according to claim 1, wherein the priority and the minimum number of the queue for each of the host computers are set by at least one of the host computers.

16. A cache controller for controlling a cache memory of a storage device, the storage device being connected to a plurality of host computers, and the cache memory including a plurality of cache slots for temporarily holding data of the storage device to be accessed by the host computers, wherein the cache controller:
- (a) recognizes a priority to each of the host computers;
- (b) recognizes a minimum number of cache slots to each of the host computers;
- (c) receives an access request for data of the storage device from an access requesting host computer; and
- (d) allocates to the access requesting host computer a cache slot for holding the requested data so that allocated cache slots form a queue on a host computer basis, the cache slots in the queue being linked in an order of allocation, wherein, as a cache slot for holding the requested data, a least-recently allocated cache slot of the queue for a lower-priority host computer is reallocated to a most-recently allocated cache slot of the queue for the access requesting host computer, if there exists no free cache slot in the cache memory, and the requested data does not exist in the cache memory, and the priority of the access requesting host computer is higher than that of the lower-priority host computer, and a number of cache slots of the queue for the lower-priority host computer exceeds the minimum number for the lower-priority host computer.

17. The cache controller according to claim 16, wherein a lowest priority and a minimum number of zero are set to a queue for free cache slots.

18. The cache controller according to claim 16, wherein, if the data thus requested in a read mode has been held in a cache slot of the queue for another host computer having a priority lower than that of the access requesting host computer, the cache slot thus holding the data is reallocated to the most-recently allocated cache slot of the queue for the access requesting host computer.

19. The cache controller according to claim 16, wherein, if there exists a free cache slot in the cache memory, the data thus requested is allocated to the free cache slot, and then the free cache slot is allocated to a most-recently allocated cache slot of the queue for the access requesting host computer.

20. A computer-readable recording medium storing a program for causing a cache controller to execute a method for controlling a cache memory of a storage device, the storage device being connected to a plurality of host computers, and the cache memory including a plurality of cache slots for temporarily holding data of the storage device to be accessed by the host computers, wherein said method comprises the steps of:
- (a) recognizing a priority to each of the host computers;
- (b) recognizing a minimum number of cache slots to each of the host computers;
- (c) receiving an access request for data of the storage device from an access requesting host computer; and (d) allocating to the access requesting host computer a cache slot for holding the data thus requested so that allocated cache slots form a queue on a host computer basis, the cache slots in the queue being linked in an order of allocation, wherein, as a cache slot for holding the requested data, a least-recently allocated cache slot of the queue for a lower-priority host computer is reallocated to a most-recently allocated cache slot of the queue for the access requesting host computer, if there exists no free cache slot in the cache memory, and the requested data does not exist in the cache memory, and the priority of the access requesting host computer is higher than that of the lower-priority host computer, and a number of cache slots of the queue for the lower-priority host computer exceeds the minimum number for the lower-priority host computer.

* * * * *